(12) United States Patent
Sugiyama (10) Patent No.: US 8,824,836 B2
(45) Date of Patent: Sep. 2, 2014

(54) OPTICAL WAVEGUIDE, OPTICAL MODULATOR AND OPTICAL COUPLER

(75) Inventor: Masaki Sugiyama, Kawasaki (JP)

(73) Assignee: Fujitsu Optical Components Limited, Kawasaki (JP)

( * ) Notice: Subject to any disclaimer, the term of this patent is extended or adjusted under 35 U.S.C. 154(b) by 436 days.

(21) Appl. No.: 13/037,463

(22) Filed: Mar. 1, 2011

(65) Prior Publication Data

US 2011/0305412 A1 Dec. 15, 2011

(30) Foreign Application Priority Data

Jun. 10, 2010 (JP) ................................. 2010-132932

(51) Int. Cl.
| | | |
|---|---|---|
| G02F 1/035 | (2006.01) | |
| G02B 6/26 | (2006.01) | |
| G02F 1/313 | (2006.01) | |
| G02F 1/225 | (2006.01) | |

(52) U.S. Cl.
CPC .............. *G02F 1/035* (2013.01); *G02F 1/2255* (2013.01); *G02F 1/3132* (2013.01); *G02F 1/3137* (2013.01)
USPC ......................... 385/2; 385/8; 385/32; 385/45

(58) Field of Classification Search
None
See application file for complete search history.

(56) References Cited

U.S. PATENT DOCUMENTS

| 5,289,551 A * | 2/1994 | Nakama et al. ................... 385/45 |
|---|---|---|
| 5,586,209 A | 12/1996 | Matsuura et al. |
| 5,590,226 A * | 12/1996 | Wolf et al. ....................... 385/45 |
| 5,627,928 A | 5/1997 | Matsuura et al. |
| 6,512,860 B2 * | 1/2003 | Bischoff et al. .................... 385/2 |
| 7,302,135 B2 * | 11/2007 | Melloni et al. ................... 385/28 |
| 2002/0122630 A1 | 9/2002 | Bona et al. |
| 2003/0202746 A1 * | 10/2003 | Hanashima ..................... 385/45 |
| 2007/0053636 A1 | 3/2007 | Takahashi et al. |
| 2009/0324157 A1 | 12/2009 | Sugiyama |

FOREIGN PATENT DOCUMENTS

| EP | 0 484 878 A2 | 5/1992 |
|---|---|---|
| EP | 0 651 268 A1 | 5/1995 |
| JP | 4-172308 | 6/1992 |
| JP | 4-213407 | 8/1992 |

(Continued)

OTHER PUBLICATIONS

European Search Report dated Aug. 16, 2011 in corresponding European Patent Application 11159360.4.

(Continued)

*Primary Examiner* — Hemang Sanghavi
(74) *Attorney, Agent, or Firm* — Staas & Halsey LLP (57) ABSTRACT

An optical waveguide formed in a substrate including: a curved waveguide; and a splitter that is coupled to the curved waveguide and branches, wherein a low refraction index portion having an effective refraction index that is lower than that of a start point of the curved waveguide on an opposite side of the splitter is provided in a waveguide extending from the start point of the curved waveguide to the splitter.

18 Claims, 12 Drawing Sheets

(56) References Cited

FOREIGN PATENT DOCUMENTS

| | | |
|---|---|---|
| JP | 5-53086 | 3/1993 |
| JP | 5-224044 | 9/1993 |
| JP | 6-67047 | 3/1994 |
| JP | 7-174929 | 7/1995 |
| JP | 7-191226 | 7/1995 |
| JP | 9-5549 | 1/1997 |
| JP | 2000-66045 | 3/2000 |
| JP | 2001-512846 | 8/2001 |
| JP | 2002071984 A * | 3/2002 |
| JP | 2002-286952 | 10/2002 |
| JP | 2002-365597 | 12/2002 |
| JP | 2005-164686 | 6/2005 |
| JP | 2006-91785 | 4/2006 |
| JP | 2008-241937 | 10/2008 |
| JP | 2010-8751 | 1/2010 |
| WO | 00/72062 A1 | 11/2000 |

OTHER PUBLICATIONS

European Summons to attend oral proceedings pursuant to Rule 115(1) EPC mailed Feb. 14, 2013 for corresponding European Application No. 11159360.4.
Allan W. Snyder et al., "Optical Waveguide Theory", British Library Cataloguing in Publication Data, Chapman and Hall Ltd., 1983, pp. vii, 482-485; Tables: "Electromagnetic Quantities", "Modal Parameters", and "Waveguides or Fiber Parameters".
European Patent Office Search Report issued on Jul. 16, 2013 in corresponding European Patent Application No. 13171824.9.
Kitoh, et al., "Bending Loss Reduction in Silica-Based Waveguides by Using Lateral Offsets", Journal of Lightwave Technology, vol. 13, No. 4, Apr. 1995.
Japanese Office Action mailed Aug. 20, 2013 in corresponding Japanese Application No. 2010-132932.
European Office Action issued Jul. 12, 2013 in corresponding European Application No. 11159360.4.

* cited by examiner

COMPARATIVE EMBODIMENT

FIG. 2B

EMBODIMENT

OPTICAL WAVEGUIDE, OPTICAL MODULATOR AND OPTICAL COUPLER

CROSS-REFERENCE TO RELATED APPLICATION

This application is based upon and claims the benefit of priority of the prior Japanese Patent Application No. 2010-132932, filed on Jun. 10, 2010, the entire contents of which are incorporated herein by reference.

FIELD

A certain aspect of embodiments described herein relates to an optical waveguide, an optical modulator and an optical coupler.

BACKGROUND

An optical waveguide device using an electrooptical crystal such as a $LiNbO_3$ (LN) substrate, a $LiTaO_3$ substrate or the like is being developed. These optical waveguide devices may be formed through processes of providing an electrode near an optical waveguide after forming the optical waveguide by forming a metal film such as Ti on a part of a crystal substrate and thermally diffusing the metal film or by proton-exchanging in benzoic acid after patterning. Japanese Patent Application Publication No. 05-53086 discloses a Mach-Zehnder optical modulator as the optical waveguide device.

The Mach-Zehnder optical modulator may have a Y-shaped splitter after a curved waveguide. In the structure, the splitter receives a mode shifted in the curved waveguide. Thus, a branching ration may be shifted from 50%. This may result in degradation of an extinction ratio of the Mach-Zehnder. A straight waveguide may be provided before the splitter in order to move the branching ratio closer to 50%. However, in this case, there is a problem that the optical modulator grows in size.

SUMMARY

According to an aspect of the present invention, there is provided an optical waveguide formed in a substrate including: a curved waveguide; and a splitter that is coupled to the curved waveguide and branches, wherein a low refraction index portion having an effective refraction index that is lower than that of a start point of the curved waveguide on an opposite side of the splitter is provided in a waveguide extending from the start point of the curved waveguide to the splitter.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

The following is a description of embodiments of the present invention, with reference to the accompanying drawings.

[a] First Embodiment

Figure 1A:
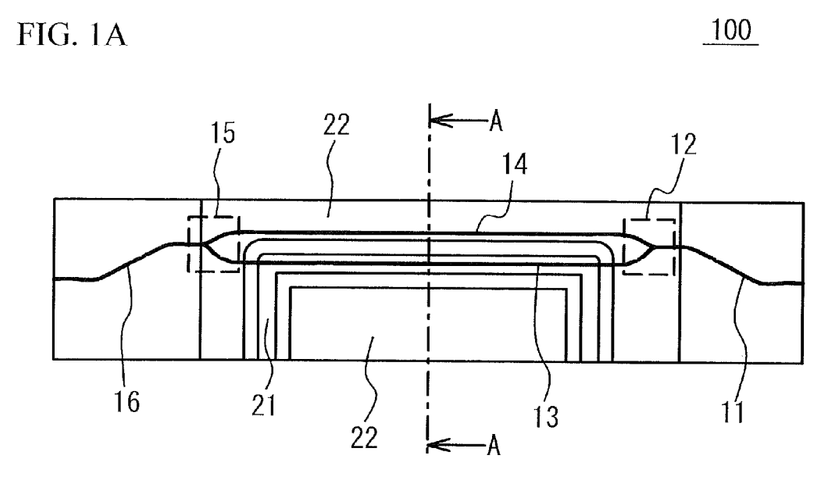
FIG. 1A illustrates a schematic plane view of a Mach-Zehnder type optical modulator in accordance with a first embodiment.
Figure 1B:
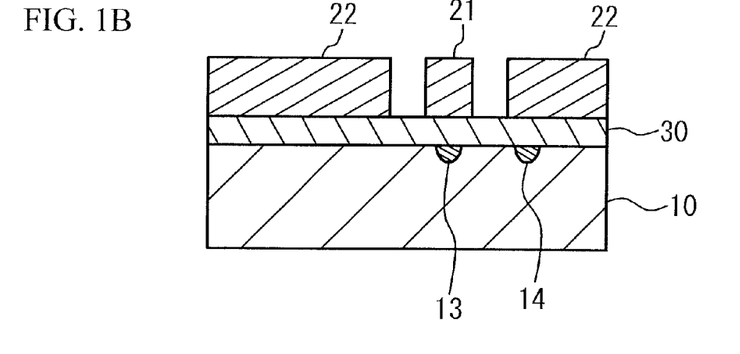
FIG. 1B illustrates a cross sectional view taken along a line A-A of FIG. 1A.

FIG. 1A illustrates a schematic plane view of a Mach-Zehnder type optical modulator 100 in accordance with a first embodiment. FIG. 1B illustrates a cross sectional view taken along a line A-A of FIG. 1A. As illustrated in FIG. 1A and FIG. 1B, the optical modulator 100 has a substrate 10 including a curved waveguide 11, a splitter 12, intermediate waveguides 13 and 14, a combiner 15, and a curved waveguide 16. The substrate 10 is an electrooptical substrate including an electrooptical crystal such as $LiNbO_3$ (LN) substrate or $LiTaO_3$ substrate.

The curved waveguide 11, the splitter 12, the intermediate waveguides 13 and 14, the combiner 15 and the curved waveguide 16 are formed through thermal diffusion of a metal such as Ti into the substrate 10. A first end of the curved waveguide 11 acts as an inputting end of the optical modulator 100. A second end of the curved waveguide 11 is coupled to a first end of the splitter 12. The splitter 12 branches toward an opposite side of the curved waveguide 11 through a Y-shaped splitter. The branched waveguides of the splitter 12 are coupled to a first end of the intermediate waveguides 13 and 14 respectively. The intermediate waveguides 13 and 14 are arranged in parallel with each other. A second end of the intermediate waveguide 13 and 14 is coupled to a first end of the curved waveguide 16 through a Y-shaped combiner of the combiner 15. A second end of the curved waveguide 16 acts as an outputting portion of the optical modulator 100. With the structure, the curved waveguide 11, the splitter 12, the intermediate waveguides 13 and 14, the combiner 15 and the curved waveguide 16 form an optical waveguide.

As illustrated in FIG. 1B, there is provided a buffer layer 30 on a face of the substrate 10 on the optical waveguide side. Thus, the optical waveguide is covered with the buffer layer 30. The buffer layer 30 is provided to prevent absorption of a light propagating in the optical waveguide into an electrode described later. The buffer layer 30 is, for example, made of $SiO_2$ or the like having a thickness of 0.2 μm to 2 μm.

A signal electrode 21 is provided above the intermediate waveguide 13. The buffer layer 30 is located between the intermediate waveguide 31 and the signal electrode 21. A ground electrode 22 is provided above the intermediate waveguide 14. The buffer layer 30 is located between the intermediate waveguide 14 and the ground electrode 22. Thus, the signal electrode 21 and the ground electrode 22 form a coplanar electrode. Each of the above electrodes is provided directly above the intermediate waveguide in order to use refraction index changing caused by an electrical field in a Z-direction, if a Z-cut substrate is used as the substrate 10.

When the optical modulator 100 is operated with high speed, a traveling-wave electrode is structured by coupling a dead end of the signal electrode 21 to a dead end of the ground electrode 22 through a resistor, and a microwave signal is applied to the traveling-wave electrode from an inputting side. In this case, refraction index of the intermediate waveguides 13 and 14 changes by $+\Delta n$ or $-\Delta n$ according to the generated electrical field. Thus, a phase difference between the intermediate waveguides 13 and 14 changes, and a Mach-Zehnder interference is established. Accordingly, an intensity-modulated optical signal is output from the second end of the curved waveguide 16. An effective refraction index of the microwave may be controlled by changing a cross section shape of the traveling-wave electrode. High-speed optical responsiveness may be obtained by matching the speed of the optical signal and that of the microwave.

As illustrated in FIG. 1A, an inputting end and an outputting end of the waveguide (the first end of the curved waveguide 11 and the second end of the curved waveguide 16) are located on approximately center of the optical modulator in a width direction, considering a combination with a fiber. The width direction of the optical modulator 100 corresponds to a vertical direction of a paper of FIG. 1A. On the other hand, in an interaction portion including the intermediate waveguides, an inputting portion and an outputting portion of the electrode are located on one side in the width direction of the optical modulator 100. The inputting portion and the outputting portion of the electrode are a bonding pad or the like. Thus, the intermediate waveguides are located on the other side. With the structure, the width of the optical modulator 100 may be reduced. However, a position of the inputting end and the outputting end of the waveguide is different from that of a waveguide of the interaction portion. So, it is effective that the waveguide is curved into a S-shape with use of the curved waveguides 11 and 16.

Figure 2A:
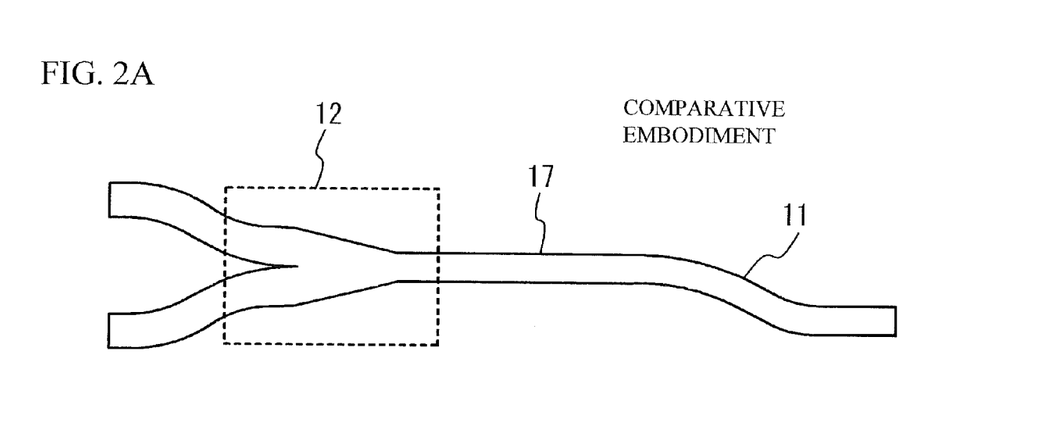
FIG. 2A illustrates a comparative embodiment.

However, if the curved waveguides 11 and 16 are provided, the splitter 12 is located after the curved waveguide 11. In this case, the splitter 12 receives a mode shifted in the curved waveguide 11. Thus, the branching ratio may be shifted from 50%. This may result in degradation of the extinction ratio of Mach-Zehnder. So, a long straight waveguide 17 may be provided before the splitter 12 as illustrated in FIG. 2A. However, with the structure, the optical modulator may grow in size. And, the branching ratio may have wavelength dependency.

Unequal division of power at the splitter, a difference of waveguide propagation loss of each path, or the like may cause the degradation of the extinction ratio of Mach-Zehnder. The present inventor has researched carefully from viewpoints of experiment and analysis in order to find a factor. In the experiment, the present inventor has researched an amount of loss in each part of the modulator in detail, and has determined a region causing the degradation of the extinction ratio.

The present inventor has repeated designing, experimental-producing, estimating, analyzing or the like of a sample for finding the factor. The present inventor has determined that shifting of the branching ratio of the splitter is highly possibly a main factor.

The present inventor has confirmed a theory through an analysis based on the research. The present inventor used a beam propagation method as a waveguide simulation, repeated structuring of a model, setting of an analysis parameter and calculating, and improved analysis accuracy through a feedback from a measured value. Thus, the present inventor has confirmed that the analysis model is adequate. Through analyzing of the analysis result, the present inventor has concluded that the branching ratio of the splitter is shifted from 50% because the splitter receives an optical propagation mode having a distribution shifted in the curved waveguide, and the shifted branching ratio is a main factor of the degradation of the extinction ratio.

Based on the analysis result, the present inventor has researched a designing method for improving the extinction ratio. The present inventor repeated the simulation with variable parameters of the splitter, and researched influence of each parameter on the extinction ratio. When the straight waveguide is provided before the splitter, the optical modulator may grow in size and may have the wavelength dependency although the branching ratio gets closer to 50%. Through the research, the present inventor has made a method for reducing an effective refraction index of a waveguide from a start point of the curved waveguide on an opposite side of the splitter to the splitter, from a viewpoint of restraining influence of disproportionate of the propagation mode. With the method, the mode shifted in the curved waveguide is not coupled to an asymmetric mode in the waveguide of the splitter. Thus, the symmetric property of the mode is improved, and the branching ratio may get closer to 50% or may correspond to 50%. The effective refraction index may be changed by changing a cross sectional area of the waveguide, by changing a width or depth of the waveguide, or by changing impurity concentration in the waveguide. In the following description, the effective refraction index is changed by changing the width of the waveguide.

Figure 2B:
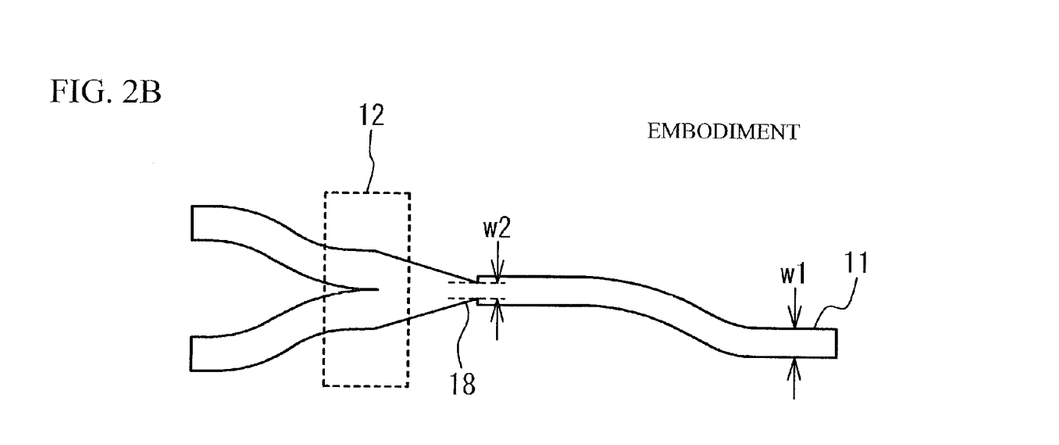
FIG. 2B illustrates a first embodiment.

In an example of FIG. 2B, a small-width portion 18 having relatively small waveguide width is provided at an end of the curved waveguide 11 on the side of the splitter 12. In concrete, a width at a start point of the curved waveguide 11 on the opposite side of the splitter 12 is referred to as "w1". A width of the small-width portion 18 is referred to as "w2". A relation "w1>w2" is satisfied. In the example of FIG. 2B, the width is discontinuously reduced at the start point of the small width portion 18 on the opposite side of the splitter 12. Thus, the effective refraction index of the small width portion 18 may be reduced by reducing the width. That is, the small width portion 18 acts as a low refraction portion having relatively small effective refraction index.

There may be possibility that confining of light at a part of a waveguide having relatively small width is degraded and radiation loss may be increased. The radiation loss depends on a wavelength of a light propagating in a waveguide. The longer the wavelength of the propagating light is, the larger the radiation loss is. And so, the present inventor has taken a trade-off with the branching ratio into consideration, and has researched a preferable width of a waveguide for reducing the loss and for improving the branching ratio.

Figure 3A:
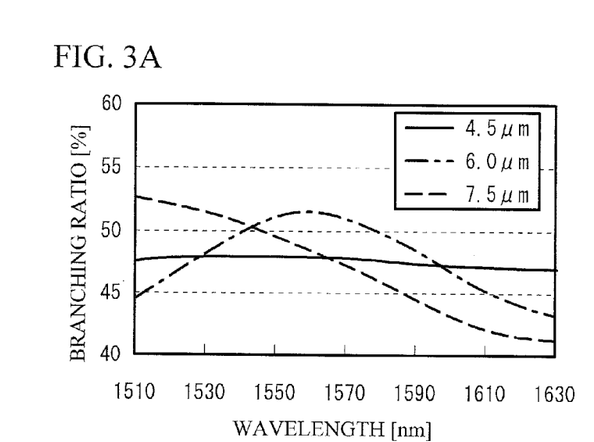
FIG. 3A illustrates a spectrum of a branching ratio in a case where a width of a start point of a small width portion is changed in a structure of FIG. 2B.
Figure 3B:
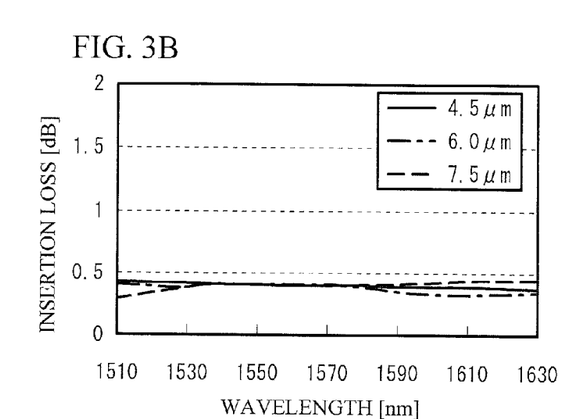
FIG. 3B illustrates an insertion loss (dB)

FIG. 3A illustrates a spectrum of the branching ratio in a case where the width of the start point of the small width portion 18 is changed in the structure of FIG. 2B. FIG. 3B illustrates an insertion loss (dB) of the small width portion 18. The width of the small width portion 18 is 4.5 μm, 6.0 μm, and 7.5 μm. As illustrated in FIG. 3A, the branching ratio of the splitter 12 is greatly shifted from 50% on the side of long wavelength when the width of the small width portion 18 is large. However, the branching ratio is improved when the width of the small width portion 18 is small. Therefore, the wavelength dependency is improved by reducing the width of the waveguide. As illustrated in FIG. 3B, the width of the waveguide has little influence on the insertion loss, and the branching ratio is improved in the range of FIG. 3B without loss increase.

A high extinction ratio (for example 25 dB or more) is required for a QPSK (Quadrature Phase Shift Keying). For example, a branching ratio of 50% plus minus 5% (within 45% to 55%) is required. The branching ratio is within 45% to 55% in the C-band (1530 nm to 1565 nm) and in the L-band (1565 nm to 1625 nm) when the width is 6.0 μm or less in FIG. 3A. It is therefore preferable that the width of the small width portion 18 is 6.0 μm or less. And it is more preferable that the width of the small width portion 18 is 4.5 μm or less.

Figure 3C:
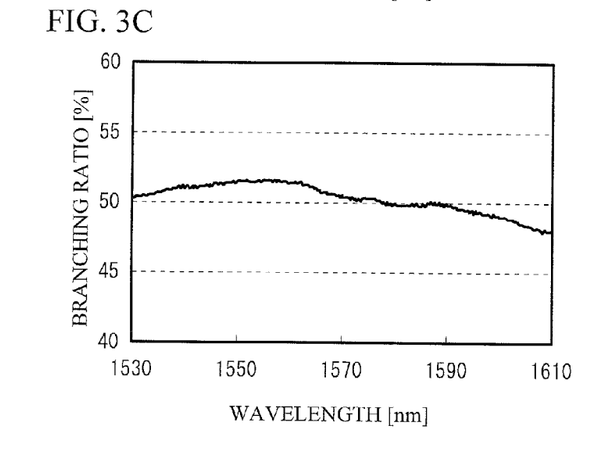
FIG. 3C illustrates wavelength dependency.

There may be a problem of designing when the small width portion 18 is provided. This is because calculation amount of data for calculating drawing points of a photo mask used in a patterning increases greatly when the waveguide is curved and the width is changed. In this case, the drawing requires a large amount of time. Therefore, forming of a pattern and checking require a large amount of time. Further, amount of calculated data is large. When, the amount of calculated data exceeds a limit, the photo mask may not be formed. So, the present inventor has created a method of discretizing the data so that the continuity of the waveguide is maintained to some extent and the amount of calculated data is reduced. The present inventor designed a sample, produced the sample experimentally, and estimated the sample. Then, as illustrated in FIG. 3C, a branching ratio having small wavelength dependency has been obtained, and the problem of designing has been solved.

Figure 3D:
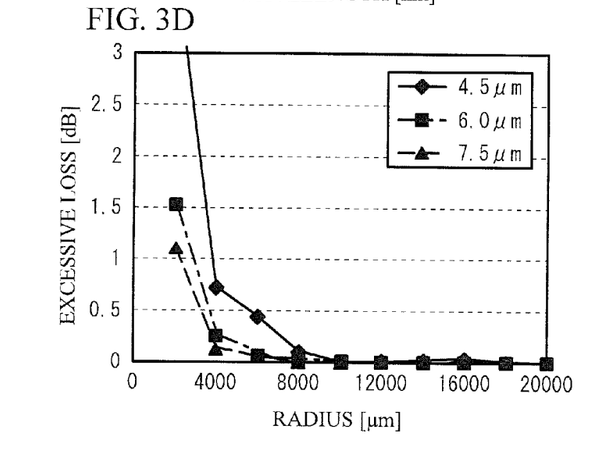
FIG. 3D illustrates a relation between a curvature radius and an excessive loss of a curved waveguide.

On the other hand, the confining effect may be degraded and the radiation loss may be increased, when the width of the small width portion 18 is reduced excessively. FIG. 3D illustrates a relation between a curvature radius and the excessive loss of the curved waveguide 11. As illustrated in FIG. 3D, the excessive loss is restrained even if the width of the small width portion 18 is small, when the curvature radius is large. However, the excessive loss increases rapidly when the curvature radius is less than 4 mm. The smaller the width of the small width portion 18 is, the larger the excessive loss is. It is therefore preferable that the curvature radius of the curved waveguide 11 is 4 mm or more.

Modified Embodiment 1-1

Figure 4A:
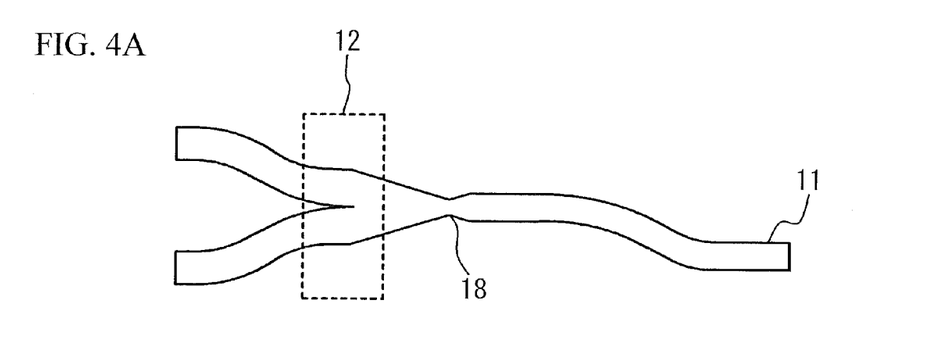
FIG. 4A illustrates a modified embodiment 1-1.
Figure 4B:
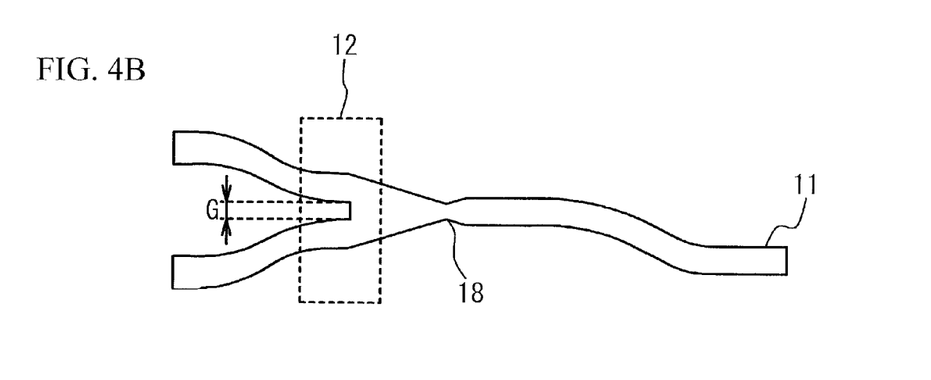
FIG. 4B illustrates another example of the modified embodiment 1-1.

FIG. 4A illustrates a structure in accordance with a modified embodiment 1-1. As illustrated in FIG. 4A, the small width portion 18 may be formed so that the width decreases gradually and continuously toward the splitter 12. That is, the small width portion 18 may have a tapered shape. In this case, scattering loss caused by the changing of the waveguide width is restrained. As illustrated in FIG. 4B, a split part of the splitter 12 may not have a sharp angle. For example, the split portion of the splitter 12 has a shape in which a cutout having a width G is formed. In this case, optical property and manufacturability of an optical waveguide may be stabilized. Other splitters in this description may not have a cutout having the width G.

Modified Embodiment 1-2

Figure 4C:
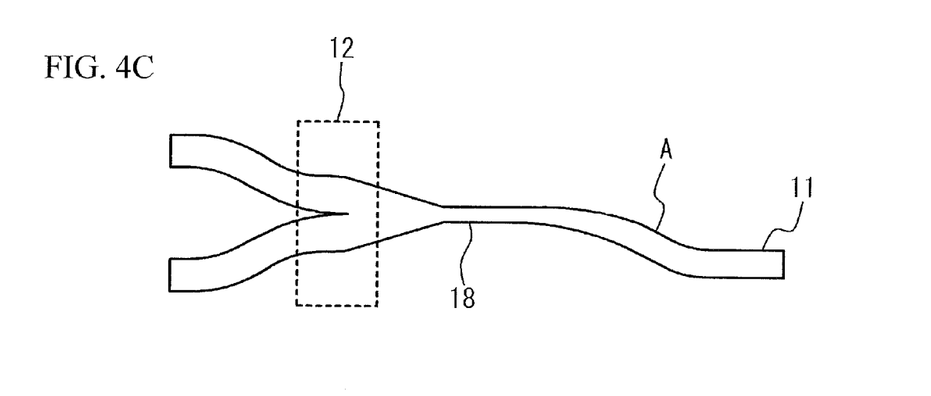
FIG. 4C illustrates a modified embodiment 1-2.

FIG. 4C illustrates a structure in accordance with a modified embodiment 1-2. As illustrated in FIG. 4C, the small width portion 18 may be a region in which the waveguide width decreases continuously from an intermediate part of the curved part of the curved waveguide 11. In this case, the scattering loss caused by the changing of the waveguide width is restrained, and the curved waveguide 11 may be downsized more.

As illustrated in FIG. 3D, the loss is enlarged when the waveguide width is small. It is therefore preferable that the curved waveguide 11 and the small width portion 18 are formed so that the curvature radius increases as the waveguide width decreases. In this case, the loss of the curved waveguide 11 may be restrained, and the curved waveguide 11 may be downsized more.

In the example of FIG. 4B, the waveguide width decreases gradually from the intermediate part of the curved part of the curved waveguide 11. Therefore, the curvature radius increases as the waveguide width gets smaller. It is preferable that the start point of the small width portion 18 is positioned on the side of the splitter 12 compared to a turning point A where a curving direction of the curved waveguide 11 is switched, when the wavelength dependency of loss is enlarged.

Modified Embodiment 1-3

There is a case where a center of a mode distribution is shifted from a center axis of the waveguide in the curved waveguide. The smaller the waveguide width is, the larger the shifting amount is. Therefore, there is a case where the axis shifting at a coupling position of the curved waveguide 11 and the splitter 12 cause a loss. And so, the center axis of the waveguide may have an off-set on any position of the small width portion 18. A direction of the off-set may be determined according to an excitation mode, a length of a curved waveguide, a width of a curved waveguide, a curvature radius of a curved waveguide or the like.

Figure 5A:
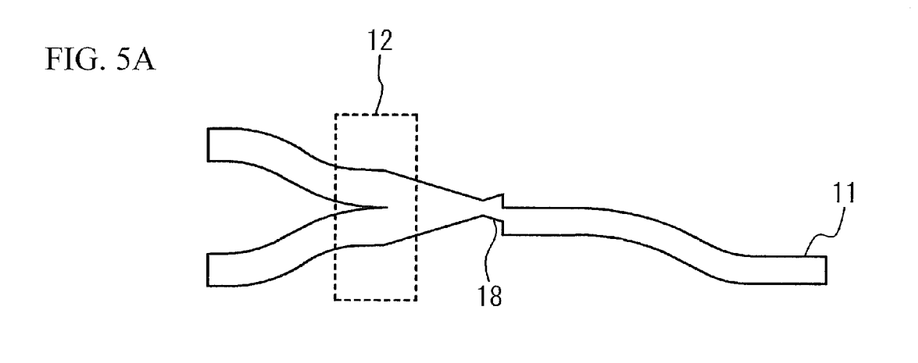
FIG. 5A illustrates a modified embodiment 1-3.

FIG. 5A illustrates a structure in accordance with a modified embodiment 1-3. As illustrated in FIG. 5A, the center axis of the waveguide may have an off-set at the start point of the small width portion 18 of the structure of FIG. 4A. In the example of FIG. 5A, the center axis of the small width portion 18 is shifted to a curving direction of the curved waveguide 11. In this case, the loss caused by the axis shifting is restrained.

Modified Embodiment 1-4

Figure 5B:
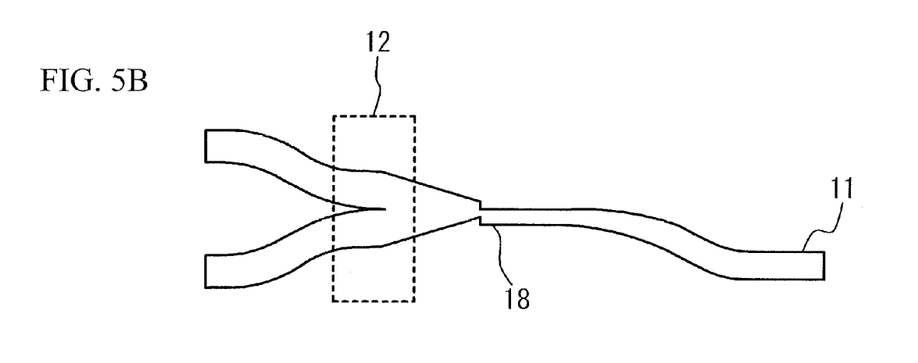
FIG. 5B illustrates a modified embodiment 1-4.

FIG. 5B illustrates a structure in accordance with a modified embodiment 1-4. As illustrated in FIG. 5B, the center axis of the waveguide may have an off-set at an end point of the small width portion 18 of the structure of FIG. 4B. In this case, the loss caused by the axis shifting is restrained.

Modified Embodiment 1-5

Figure 6A:
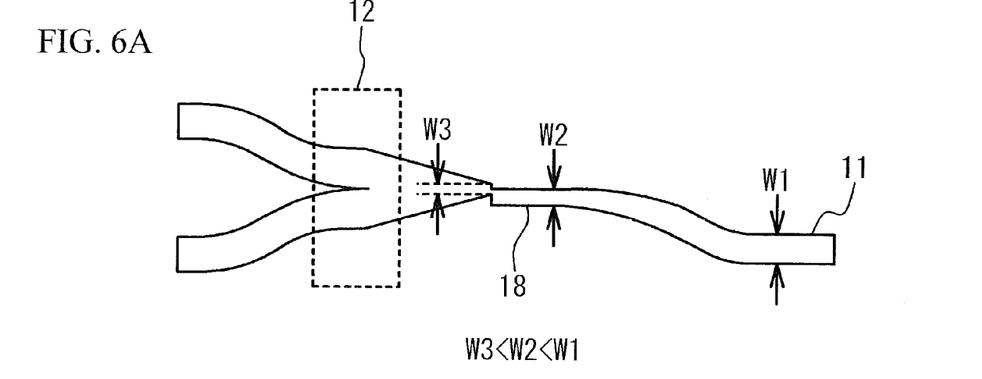
FIG. 6A illustrates a modified embodiment 1-5.

FIG. 6A illustrates a structure in accordance with a modified embodiment 1-5. When the waveguide width is reduced, a difference of mode diameter between a curved portion and a straight portion is enlarged. In this case, mode mismatch may cause a loss. And so, as illustrated in FIG. 6A, the waveguide width may be reduced discontinuously in the small width portion 18. It is assumed that the width of the start point of the curved waveguide 11 is "w1", the width just before the discontinuously reduced position of the small width portion 18 is "w2", and the width just after the discontinuously reduced position of the small width portion 18 is "w3". In the condition, a relation "w1>w2>w3" may be satisfied. In this case, the loss caused by the mode mismatch is restrained. In the example of FIG. 6A, the center axis has an off-set. However, the center axis may not have the off-set.

Modified Embodiment 1-6

Figure 6B:
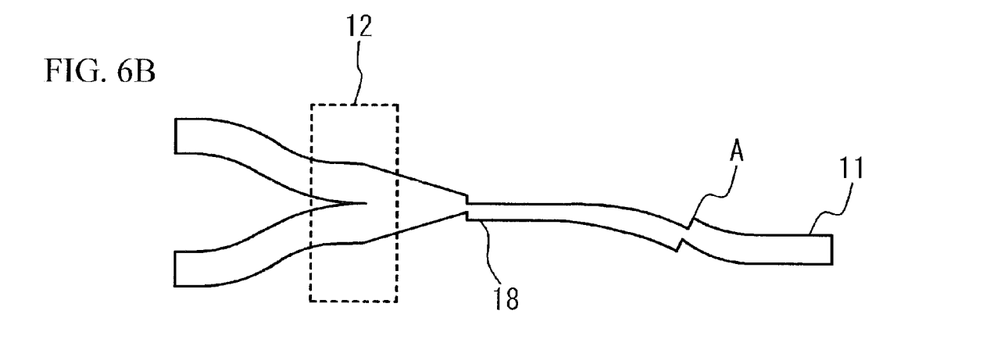
FIG. 6B illustrates a modified embodiment 1-6.

FIG. 6B illustrates a structure in accordance with a modified embodiment 1-6. It is preferable that the small width portion 18 is longer, in order to remove unnecessary mode at an intermediate of the curved waveguide 11. And so, it is preferable that the small width portion 18 extends from an opposite side of the splitter 12 compared to the turning point A of the curved waveguide 11 to the splitter 12, when the curved waveguide 11 is formed in a S-shape. The waveguide width is reduced at the turning point A of the curved waveguide 11. In this case, the loss caused by the axis shifting of the mode may be enlarged. And so, the center axis of the waveguide may have an off-set at the turning point A as illustrated in FIG. 6B.

Modified Embodiment 1-7

Figure 6C:
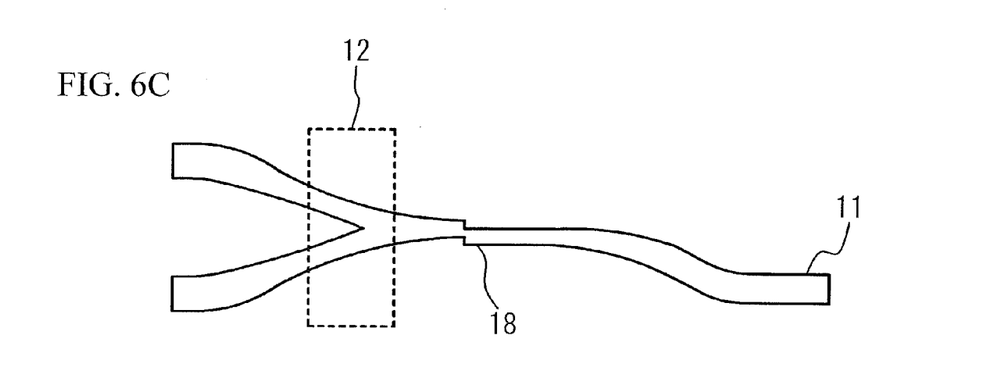
FIG. 6C illustrates a modified embodiment 1-7.

FIG. 6C illustrates a structure in accordance with a modified embodiment 1-7. As illustrated in FIG. 6C, a width of the branched waveguides of the splitter 12 may increase gradually or in steps from the curved waveguide 11 side toward the opposite side. In this case, the width of the branched waveguides of the splitter 12 is smaller than that of the intermediate waveguides 13 and 14 (the interaction portion). Therefore, generation of unnecessary mode after the branching is restrained, and degradation of modulation efficiency of the interaction portion is restrained. It is preferable that the width of the two branched waveguides of the splitter 12 is changed at the same ratio in the propagation direction in order to move the branching ratio of the splitter 12 closer to 50%.

In the above embodiments, the small width portion 18 acting as a low refraction index portion is positioned before the interaction portion. However, the small width portion 18 may be positioned after the interaction portion. In concrete, the small width portion 18 may be formed in a waveguide extending from an end of the curved waveguide 16 on an opposite side of the combiner 15 to the combiner 15. In this case, the combiner 15 acts as a splitter that is coupled to a curved waveguide and branches. An outputting portion of the curved waveguide 16 acts as a start point of a curved waveguide on an opposite side of a splitter.

Second Embodiment

Figure 7A:
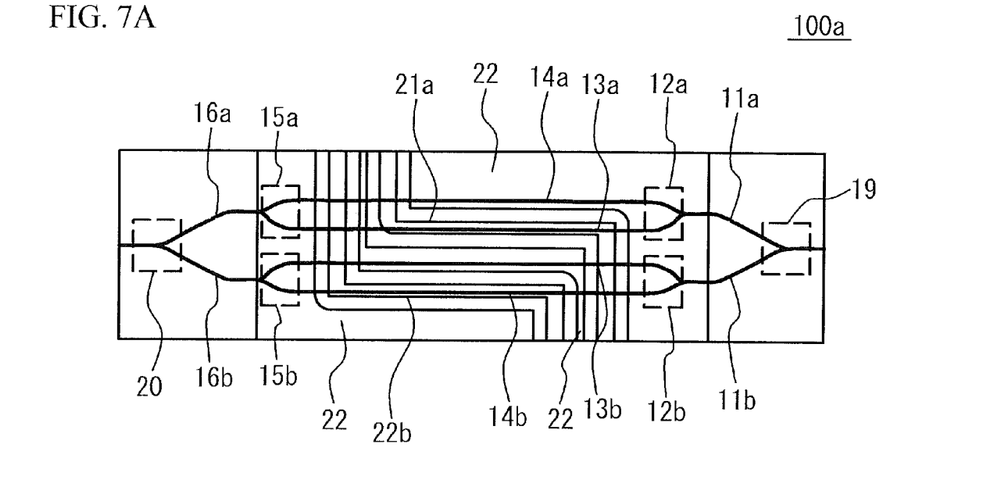
FIG. 7A illustrates a schematic plane view of a QPSK optical modulator in accordance with a second embodiment.

A description will be given of a QPSK (Quadrature Phase Shift Keying) modulator in a second embodiment. FIG. 7A illustrates a schematic plane view of a QPSK optical modulator 100a in accordance with a second embodiment. As illustrated in FIG. 7A, the QPSK optical modulator 100a has an electrooptical substrate including two Mach-Zehnder modulators (a first Mach-Zehnder modulator and a second Mach-Zehnder modulator). At least one of the first Mach-Zehnder optical modulator and the second Mach-Zehnder optical modulator has the same structure as the Mach-Zehnder optical modulator 100 in accordance with the first embodiment.

The first Mach-Zehnder optical modulator has a curved waveguide 11a, a splitter 12a, intermediate waveguides 13a and 14a, a combiner 15a and a curved waveguide 16a. The second Mach-Zehnder optical modulator has a curved waveguide 11b, a splitter 12b, intermediate waveguides 13b and 14b, a combiner 15b and a curved waveguide 16b.

The QPSK optical modulator 100a has a splitter 19 at a light-incoming end and a combiner 20 at a light-outputting end. The curved waveguide 11a and the curved waveguide 11b branch at the splitter 19. The curved waveguide 16a and the curved waveguide 16b combine at the combiner 20.

Figure 7B:
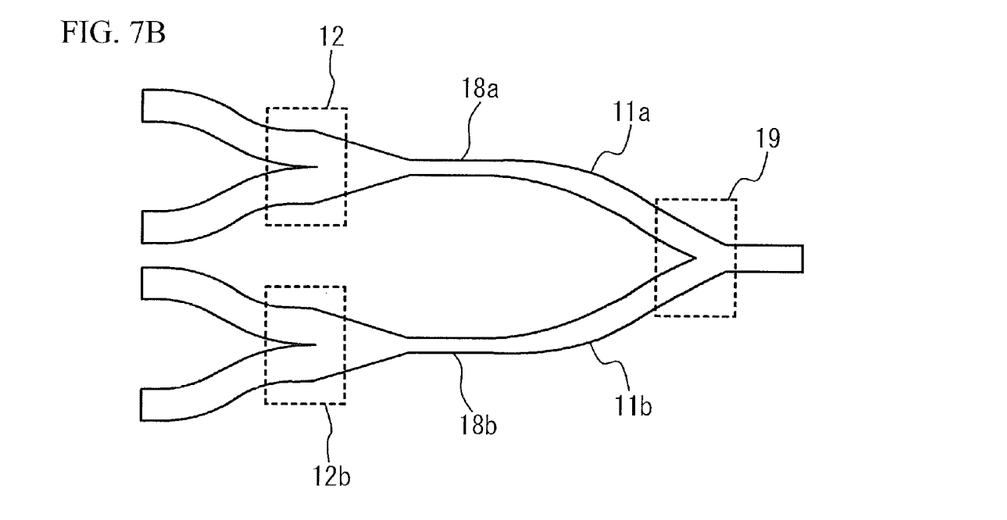
FIG. 7B illustrates an enlarged view of splitters and a curved waveguide.

FIG. 7B illustrates an enlarged view of the splitter 19, the curved waveguides 11a and 11b and the splitters 12a and 12b. In an example of FIG. 7B, a small width portion 18a is provided in a waveguide extending from a start point of the curved waveguide 11a to the splitter 12a, and a small width portion 18b is provided in a waveguide extending from a start point of the curved waveguide 11b to the splitter 12b. In this case, the degradation of the branching ratio is restrained in both of the splitters 12a and 12b.

Figure 8:
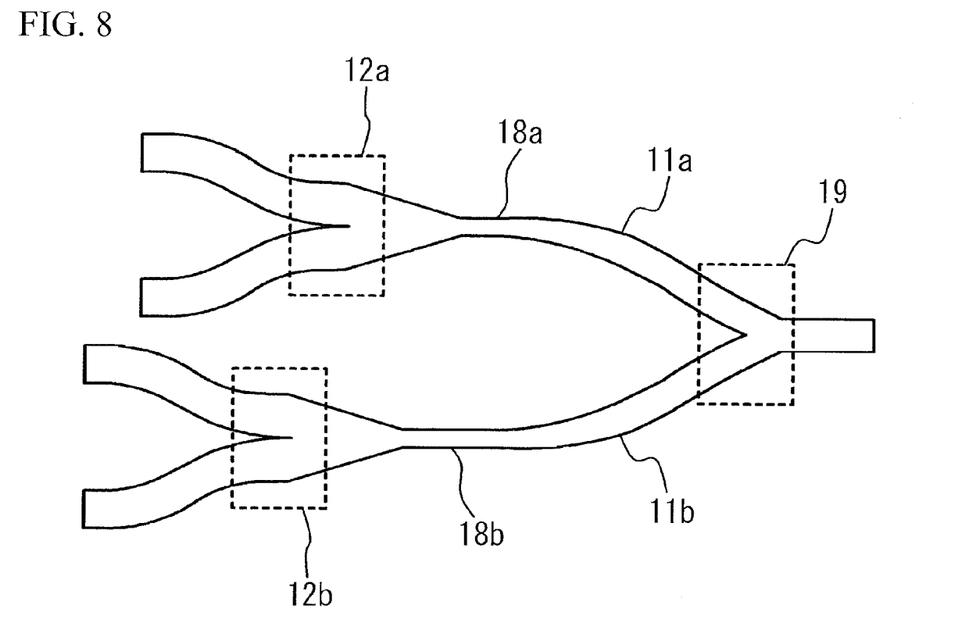
FIG. 8 illustrates another example of splitters and a cured waveguide.

FIG. 8 illustrates another example of the curved waveguides 11a and 11b and the splitters 12a and 12b. In an example of FIG. 8, the splitter 12a and the splitter 12b may be located at different position in a longitudinal direction (propagation direction) of the QPSK optical modulator 100a. In this case, the curved waveguide 11a and the curved waveguide 11b may have a different curvature radius, a different angle or the like. Thus, the shape of the small width portions 18a and 18b may be determined separately.

For example, the length of the small width portion 18a in the propagation direction may be different from that of the small width portion 18b. The width of the small width portion 18a may be different from that of the small width portion 18b. When the center axis of the small width portions 18a and 18b has an off-set, the off-set amount of the small width portion 18a may be different from that of the small width portion 18b. The width of a start point of the splitter 12a may be different from that of the splitter 12b. Coupling loss of each waveguide may be reduced when each parameter is optimized.

Third Embodiment

Figure 9A:
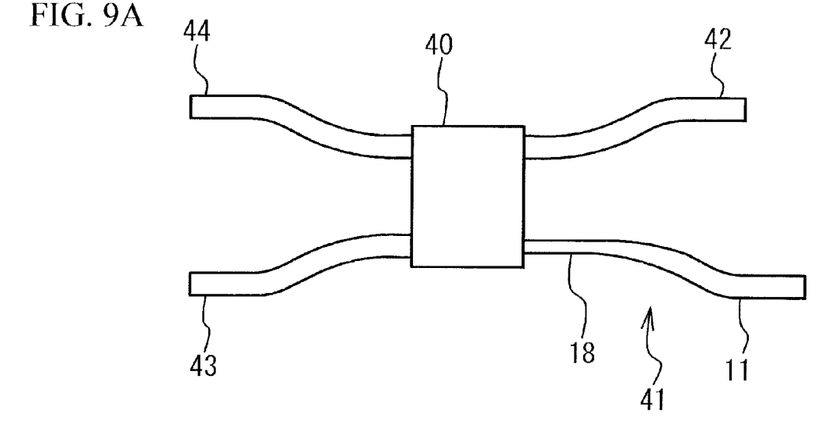
FIG. 9A through FIG. 9C illustrate an optical coupler.

A description will be given of a "m"×"n" optical coupler in a third embodiment. As an example, an optical coupler in accordance with the third embodiment is 2×2 optical coupler. FIG. 9A illustrates a schematic plane view of an optical coupler 40 in accordance with the third embodiment. As illustrated in FIG. 9A, the optical coupler 40 has two inputting waveguides 41 and 42 and two outputting waveguides 43 and 44. At least one of the inputting waveguides 41 and 42 and the outputting waveguides 43 and 44 has the curved waveguide 11 and the small width portion 18 in accordance with the first embodiment. The optical coupler 40 acts as the splitter 12 in accordance with the first embodiment.

In the example of FIG. 9A, the inputting waveguide 41 includes the curved waveguide 11 and the small width portion 18. In the example of FIG. 9A, the small width portion 18 is provided in a waveguide extending from the start point of the curved waveguide 11 to the optical coupler 40. In this case, degradation of a branching ratio of a light from the inputting waveguide 41 is restrained. The preferable branching ratio may not be limited to 50% in the optical coupler 40, and may be set to be a desirable one required for the optical coupler 40.

Figure 9B:
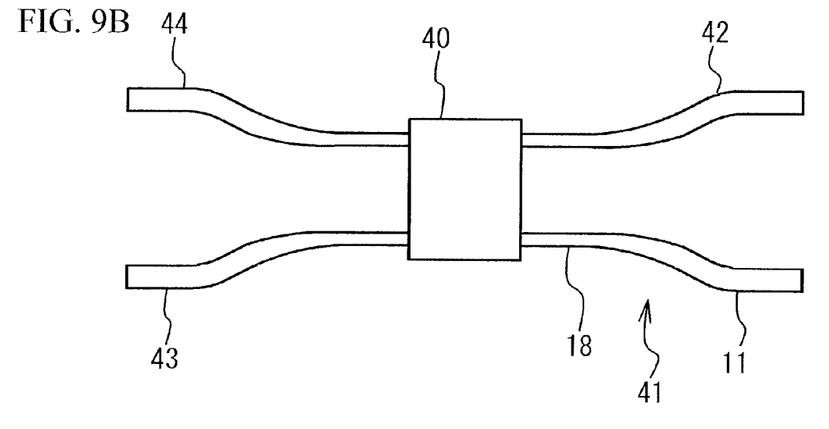

As illustrated in FIG. 9B, the small width portion may be provided in all of the inputting waveguides 41 and 42 and the outputting waveguides 43 and 44. Each width may decrease toward the optical coupler 40 with the same ratio in at least two of the waveguides. In this case, the loss and the wavelength dependency of the two waveguides may be equal to each other. Variation of a loss difference between the two waveguides at the designing and at the manufacturing may be restrained. Thus, an extinction ration having small production tolerance in a wide wavelength range may be obtained. From the viewpoint, two waveguides coupled to the optical coupler 40 from the same side may be symmetrically located with respect to the center axis of the optical coupler 40.

Figure 9C:
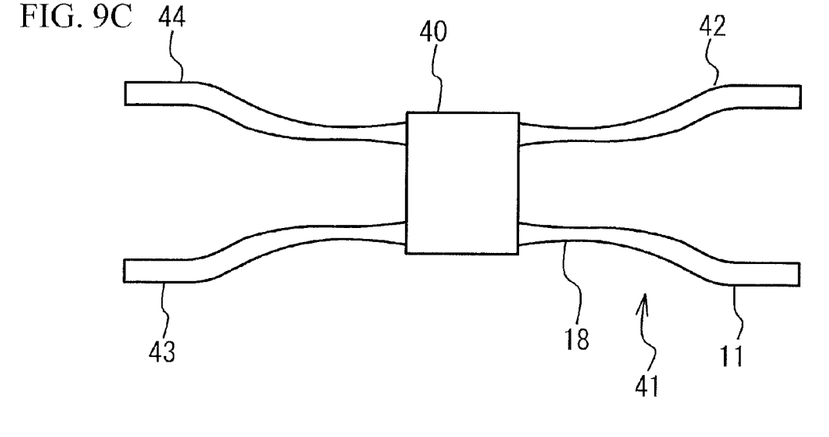

As illustrated in FIG. 9C, the waveguide width on the side of the optical coupler 40 may be larger than that of the small width portion 18. In this case, the coupling loss caused by extended mode field caused by the small waveguide width is restrained.

Figure 10A:
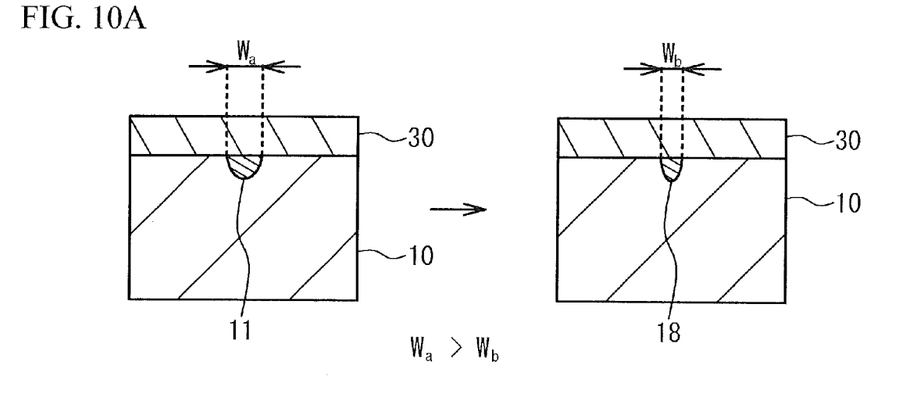
FIG. 10A through FIG. 10C illustrate an adjusting method of an effective refraction index.
Figure 10B:
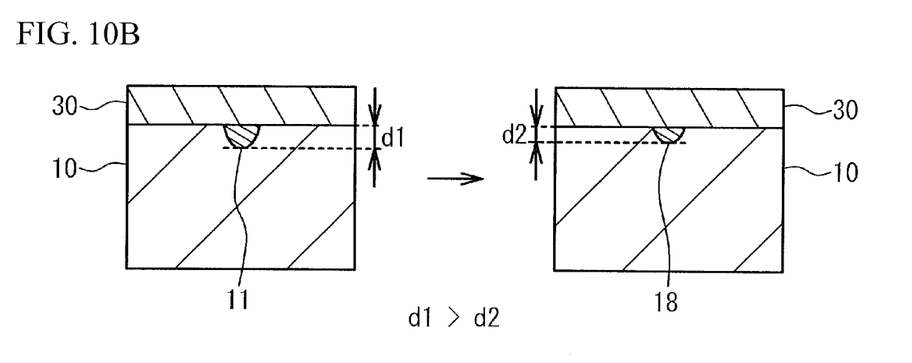
Figure 10C:
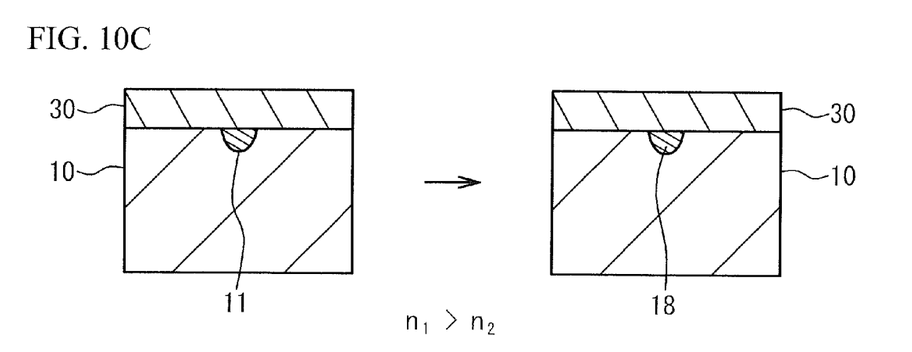

In the above embodiments, the effective refraction index is reduced by reducing the waveguide width. FIG. 10A through FIG. 10C illustrate another adjusting method of the effective refraction index. As mentioned above, the effective refraction index may be adjusted based on a cross sectional area of a waveguide, a width of a waveguide, a depth of a waveguide, impurity concentration of a waveguide and so on.

The effective refraction index may be reduced by reducing the cross sectional area of a waveguide. In concrete, as illustrated in FIG. 10A, when a relation "a waveguide width wb<a waveguide width wa" is satisfied, an effective refraction index of a waveguide having the waveguide width wb is smaller than that of a waveguide having the waveguide width wa. As illustrated in FIG. 10B, when a relation "a waveguide depth d2<a waveguide depth d1" is satisfied, an effective refraction index of a waveguide having the waveguide depth d2 is smaller than that of a waveguide having the waveguide depth d1.

As illustrated in FIG. 10C, a relation "impurity concentration n2 of a waveguide<impurity concentration n1" is satisfied, an effective refraction index of a waveguide having the impurity concentration n2 is smaller than that of a waveguide having the impurity concentration n1.

Figure 11:
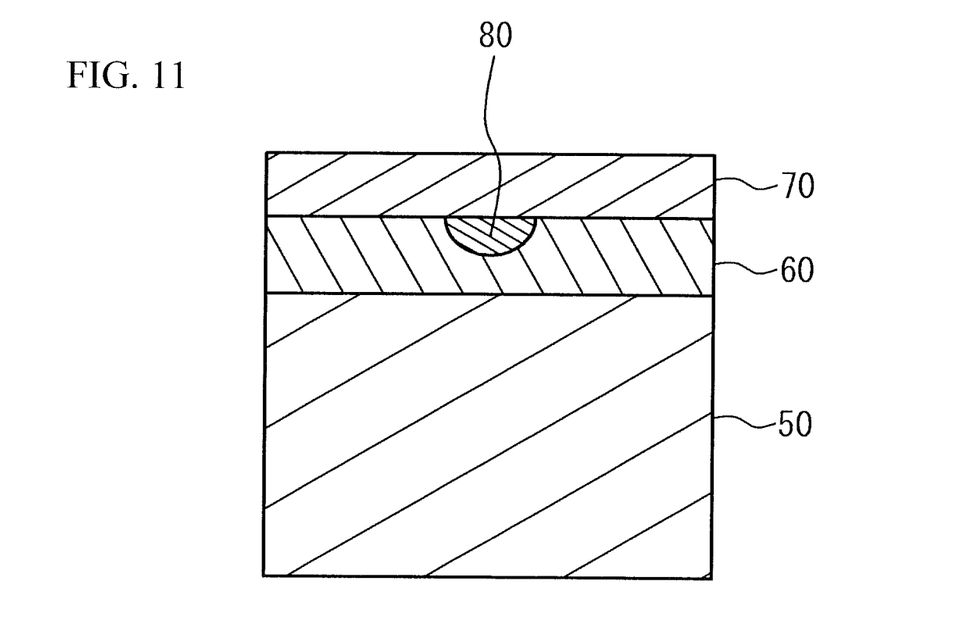
FIG. 11 illustrates a cross sectional view of a silicon waveguide.

The structure of the waveguide is not limited to the above examples. As another example, a silicon waveguide may be used. FIG. 11 illustrates cross sectional view of a silicon waveguide. As illustrated in FIG. 11, the silicon waveguide may have a lower cladding layer 60 and an upper cladding layer 70 on a silicon substrate 50. An optical waveguide 80 may be formed in the lower cladding layer 60. For example, a silica glass may be used as the lower cladding layer 60 and the upper cladding layer 70. The optical waveguide 80 may be faulted by injecting Ge or the like into the lower cladding layer 60 with a solid-phase diffusion method, an ion-plating method or the like. The above embodiments may be used in the silicon waveguide.

In the above embodiments, a S-shaped curved waveguide is used as a curved waveguide. However a structure is not limited to the above structure. The coupling between the curved waveguide and the splitter causes the shifting of the branching ratio of the splitter. Therefore, a curved waveguide curving toward only a single direction may be used in the above embodiments.

Fourth Embodiment

Figure 12:
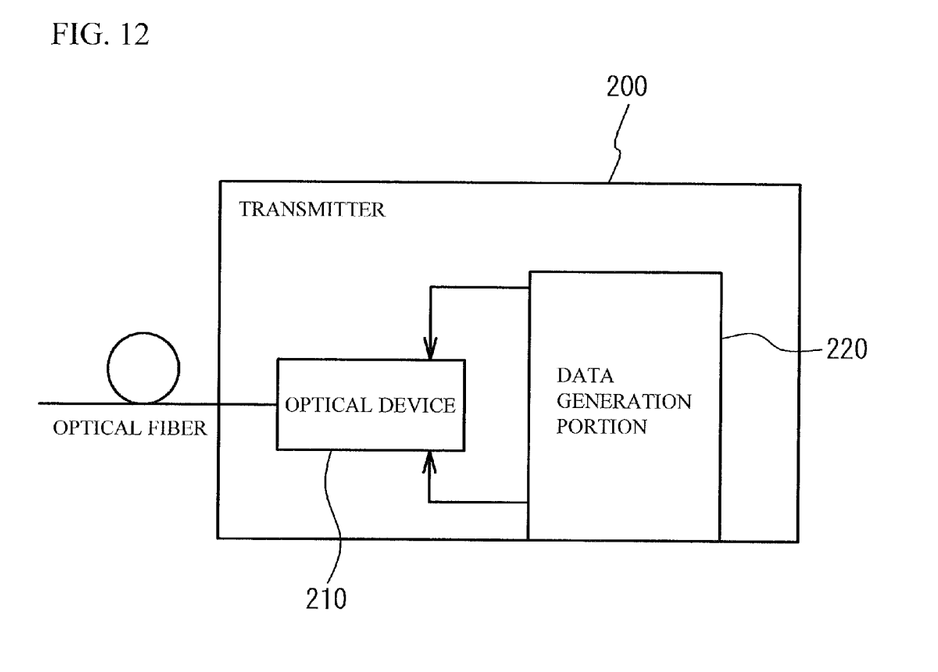
FIG. 12 illustrates a block diagram of an optical transmitter in accordance with a fourth embodiment.

FIG. 12 illustrates a block diagram of an optical transmitter 200 in accordance with a fourth embodiment. As illustrated in FIG. 12, the optical transmitter 200 has an optical device 210, a data generation portion 220 and so on. The optical device 210 is a semiconductor laser or the like having any one of the above-mentioned optical modulators. The data generation portion 220 transmits a drive signal for driving the optical device 210 to the optical device 210. The optical device 210 outputs an optical modulation signal according to the drive signal from the data generation portion 220. The optical modulation signal is output outside through an optical fiber or the like. An optical modulator mounted on the optical device 210 may be downsized and may have a high extinction ratio. Therefore, the optical transmitter 200 may output a high property optical signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An optical modulator of Mach-Zehnder type comprising:
    a curved waveguide; and
    a splitter that is coupled to the curved waveguide and branches,
    wherein a low refraction index portion having an effective refraction index that is lower than that of a start point of the curved waveguide on an opposite side of the splitter is provided in a waveguide extending from the start point of the curved waveguide to the splitter;
    the low refraction index portion has a curve; and
    the effective refraction index of the curve of the low refraction index portion increases or decreases continuously or in steps toward the splitter.

2. The optical modulator of Mach-Zehnder type as claimed in claim 1, wherein the effective refraction index of the low refraction index portion decreases continuously or in steps toward the splitter.

3. The optical modulator of Mach-Zehnder type as claimed in claim 1, wherein the low refraction index portion is provided at an intermediate of the curved waveguide.

4. The optical modulator of Mach-Zehnder type as claimed in claim 3, wherein a curvature radius of the curved waveguide is 4 mm or more.

5. The optical modulator of Mach-Zehnder type as claimed in claim 3, wherein the curvature radius of the low refraction index portion increases as the effective refraction index decreases.

6. The optical modulator of Mach-Zehnder type as claimed in claim 1, wherein a center axis of a waveguide has an off-set in the low refraction index portion.

7. The optical modulator of Mach-Zehnder type as claimed in claim 1, wherein:
    the curved waveguide is a S-shaped curved waveguide; and
    the start point of the low refraction index portion on the opposite side of the splitter is positioned on an opposite side of the splitter compared to a turning point where a curving direction of the curved waveguide is switched, in the curved waveguide.

8. The optical modulator of Mach-Zehnder type as claimed in claim 7, wherein a center axis of a waveguide has an off-set at the turning point of the curved waveguide.

9. The optical modulator of Mach-Zehnder type as claimed in claim 1, wherein:
the curved waveguide is a S-shaped curved waveguide; and
the start point of the low refraction index portion on the opposite side of the splitter is positioned on the side of the splitter compared to a turning point where a curving direction of the curved waveguide is switched, in the curved waveguide.

10. The optical modulator of Mach-Zehnder type as claimed in claim 1, wherein an effective refraction index of each branched waveguide of the splitter increases gradually or in steps toward an opposite side from a branching point.

11. The optical modulator of Mach-Zehnder type as claimed in claim 10, wherein an effective refraction index of each branched waveguide is changed with the same ratio in an optical propagation direction.

12. The optical modulator of Mach-Zehnder type as claimed in claim 1, wherein the low refraction index portion has relatively small effective refraction index by having a cross sectional area that is lower than that of the start point of the curved waveguide.

13. The optical modulator of Mach-Zehnder type as claimed in claim 1, wherein the low refraction index portion has relatively small effective refraction index by having a width that is smaller than that of the start point of the curved waveguide.

14. The optical modulator of Mach-Zehnder type as claimed in claim 13, wherein a minimum width of the low refraction index portion is 6 μm or less.

15. The optical modulator of Mach-Zehnder type as claimed in claim 1, wherein the low refraction index portion has relatively small effective refraction index by having a depth that is smaller than that of the start point of the curved waveguide.

16. The optical modulator of Mach-Zehnder type as claimed in claim 1, wherein the low refraction index portion has relatively small effective refraction index by having impurity concentration that is lower than that of the start point of the curved waveguide.

17. An optical modulator of Mach-Zehnder type comprising:
an optical waveguide that is provided at least at one of a branch portion on an optical input side and a branch portion on an optical output side,
wherein:
the optical waveguide is formed in a substrate having electrooptical effect;
the optical waveguide has a curved waveguide and a splitter that is coupled to the curved waveguide and branches;
a low refraction index portion having an effective refraction index that is lower than that of a start point of the curved waveguide on an opposite side of the splitter is provided in a waveguide extending from the start point of the curved waveguide to the splitter;
the low refraction index portion has a curve; and
the effective refraction index of the curve of the low refraction index portion increases or decreases continuously or in steps toward the splitter.

18. An optical modulator of Mach-Zehnder type comprising a substrate that has a waveguide including a splitter and a curved waveguide,
wherein:
a first end of the curved waveguide is coupled to the splitter;
a second end of the curved waveguide acts as an optical input end or an optical output end;
the curved waveguide has a low refraction index portion having an effective refraction index that is lower than that of a start point of the curved waveguide, in a waveguide from the start point to the splitter;
the low refraction index portion has a curve; and
the effective refraction index of the curve of the low refraction index portion increases or decreases continuously or in steps toward the splitter.

* * * * *